United States Patent Office 3,497,290
Patented Feb. 24, 1970

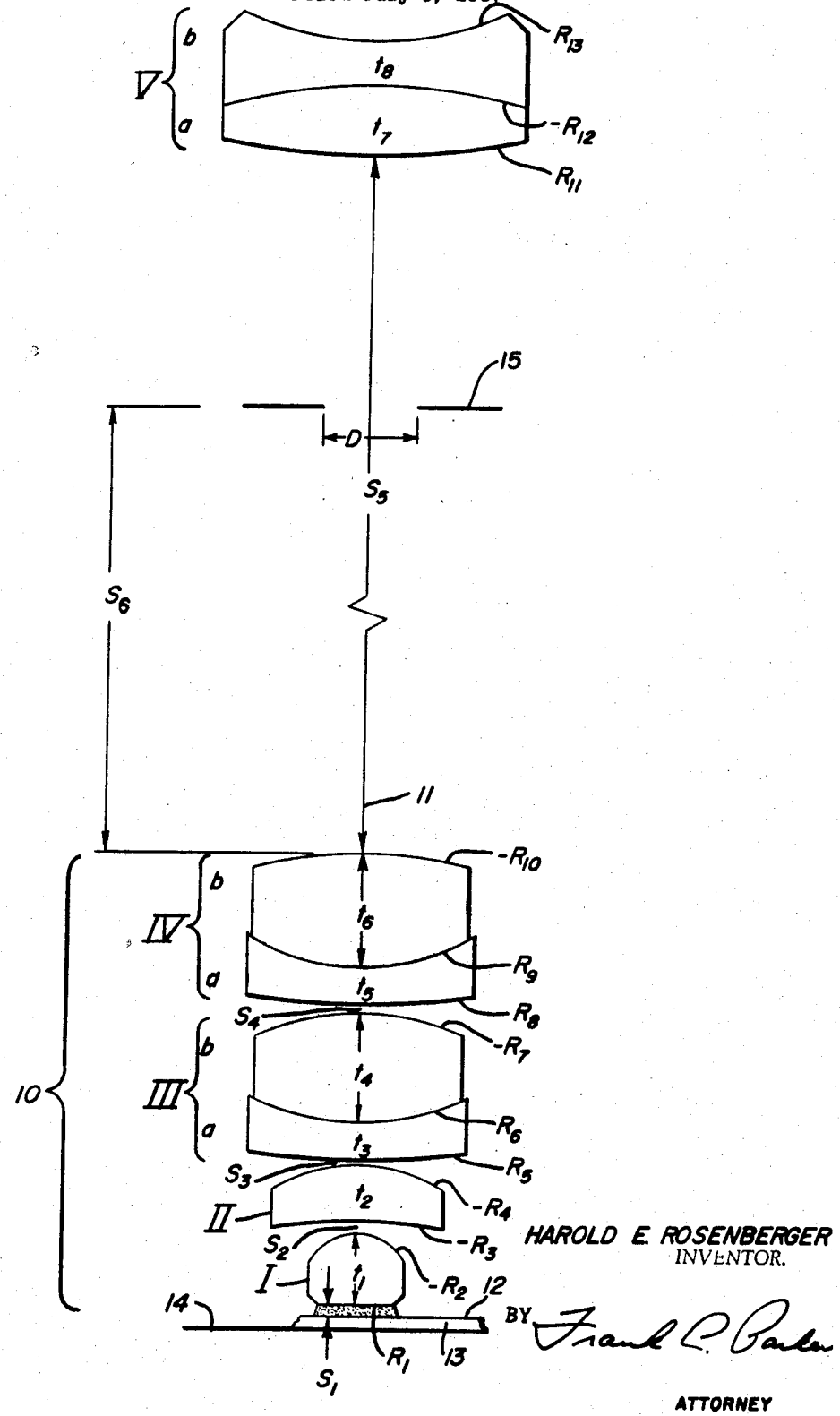

3,497,290
100× MAGNIFICATION SEMI-OBJECTIVE WITH FIELD FLATTENING LENS
Harold E. Rosenberger, Brighton, N.Y., assignor to Bausch & Lomb Incorporated, Rochester, N.Y., a corporation of New York
Filed July 3, 1967, Ser. No. 650,668
Int. Cl. G02b 15/02
U.S. Cl. 350—183                    6 Claims

ABSTRACT OF THE DISCLOSURE

A microscope semi-objective having substantially 20× magnification per se which is designed for use with an associated negative field flattening lens having substantially 5× magnification so as to produce cooperatively a total magnification of substantially 100× and a numerical aperture of 1.0, said semi-objective being one of a set of such semi-objectives of different powers which are used interchangeably with the field flattening lens.

Background of invention

A semi-objective of the kind described herebelow is intended for use in cooperative association with a plurality or set of other related semi-objectives which are mounted in a microscope rotatable nosepiece, as shown in Rosenberger Ser. No. 408,875 filed Nov. 4, 1964, now abandoned in favor of continuation application Ser. No. 732,485, and Aklin et al. Ser. No. 460,658 filed June 2, 1965, now U.S. Patent 3,405,993, the individual semi-objectives having different respective magnifications covering a large range of total image magnification, each such semi-objective being corrected abberation-wise together with a single stationary negative corrector or field flattening lens to produce the best practical overall correction of the image aberrations.

Such a semi-objective is not known in the prior art and the closest known art, as far as the form of the semi-objective is concerned, is the patent to H. Boegehold, Patent No. 2,206,155 issued on July 2, 1940 wherein the rearmost negative lens is constructed as a part of the objective and is closely spaced from its adjacent lens instead of being designed as a component part of several other objectives in an associated set of objectives having progressive magnifying powers. Attention also is directed to FIG. 1 of the British Patent 945,467 issued to Baker on Jan. 22, 1964. Nowhere in these prior art references is there any mention of a separate aberration correcting lens which is designed to be combined individually with each of said set of micro-objectives.

Summary

The present invention relates to microscope optical systems and more particularly relates to improvements in the objective lens system thereof.

It is an object of the present invention to provide a novel objective lens having essentially a total magnification of 100× and a numerical aperture of 1.0 for a microscope, said system being formed cooperatively by a semi-objective having per se substantially 20× magnification and a negative field flattening and aberration correcting lens having substantially 5× magnification.

It is a further object to provide such a microscope objective lens system which cooperatively produces an excellent flat field and substantially corrects the chromatic and monochromatic image aberrations including secondary spectrum, Petzval condition, and astigmatism, the construction thereof being comparatively economical and low cost compared to micro objectives of comparable rating and performance.

Further objects and advantages will be apparent in the details of the constituent parts thereof as set forth in the following specification taken together with accompanying drawing.

Description of the drawings

The single figure of the drawing is an optical diagram showing the preferred form of the present invention.

Description of preferred embodiment

As mentioned hereabove, the complete objective lens system here disclosed comprises a semi-objective designated generally by numeral 10 and an aberration correcting field flattening negative lens designated V which are aligned with each other on an optical axis 11 and which together produce an image magnification of 100× and a numerical aperture of substantially 1.0. The comparatively large numerical aperture is dependent upon the use of a suitable oil between the top surface 12 of a cover glass 13, which rests on a specimen surface 14, and the objective 10. Such an objective is classified as an oil-immersion objective.

An important characteristic of the present invention is the flat field and excellent achromatism of the image produced by said objective lens system which is achieved very largely through the use of the negative field flattening lens V as a necessary part of the objective lens system.

In the semi-objective 10, the front lens lying next to the cover glass 13 is a singlet lens member and is designated I, the axial space between the surface 12 of the cover glass 13 and front lens I being designated $S_1$ and being filled with a suitable oil during use so as to extend the value of the numerical aperture of the objective to the value 1.0 mentioned hereabove. The axial thickness of lens I is designated $t_1$.

Aligned on axis 11 next rearwardly of lens member I is a positive meniscus lens member designated II which has its concave surface facing the specimen surface 14. Lens member II is spaced from member I at an axial distance designated $S_2$ and the axial thickness of member II is designated $t_2$.

Closely spaced rearwardly of member II at a distance designated $S_3$ is a doublet positive lens member designated III which is composed of a front convex-concavo lens element designated IIIa having an axial thickness which is denoted by $t_3$. Lying in surface contact with the concave surface of element IIIa is a double convex lens element which is designated IIIb and has an axial thickness denoted $t_4$. Rearwardly spaced at an axial distance $S_4$ from doublet lens member III is a second doublet lens member IV which is composed of a negative meniscus lens element designated IVa which is concave toward the rear and in contact therewith is a rear double convex element denoted IBb. The axial thicknesses of lens elements IVa and IVb are designated $t_5$ and $t_6$. Rearwardly of lens member IV on axis 11 is aligned the aforesaid field flattening and aberration correcting lens member V at an axial distance denoted $S_5$ therefrom. Member V is composed of a front double convex lens element Va which lies in surface contact with a rear double concave lens element Vb, the respective axial thicknesses thereof being $t_7$ and $t_8$.

In the airspace $S_5$ is located a stray eight diaphragm 15 at an axial distance $S_6$ rearwardly of lens member IV, the diameter of said diaphragm being designated D.

The advantageous properties of the objective lens system which are pointed out hereabove are the result of painstaking experimentation and calculation which result in lens constructional data as given in the tables herebelow. It will be seen that certain values of the lens parameters are given in ranges of values which include a nominal or ideal value. Such ranges of values are so stated for the primary purpose of facilitating manufacture of the lens system, particularly the lens elements thereof.

It is well known in the art that it is practically impossible to manufacture a production quantity of glass lens elements economically while holding every lens parameter to zero toluene. Ideal values of the lens parameters can not be achieved except by long, tedious and very expensive operations.

Therefore the lens designer specifies tolerances or ranges of values for each lens parameter within which the lens elements may be practically manufactured economically while still producing a set of lenses which may be assembled into a completed objective having good optical performance.

The technical procedure used is highly successful in producing an optical system economically which is capable of good optical performance and it comprises the steps of classifying a production quantity of lens parts according to finely graded sizes and subsequently a skilled operator carefully selects lens elements which produce collectively a good optical performance when combined into one optical system. As far as possible, the lens elements are so selected as to compensate each other in correcting or reducing image aberrations.

In accordance with the foregoing explanation, the lens parameters are defined, in terms of F, as ranges of values in the Table I herebelow wherein F represents the equivalent focal length of lenses I to V together, $F(I)$ to $-F(V)$ represent the equivalent focal lengths of the successive lenses I to V, and their constituent lens elements $IIIa$, $IIIb$, $IVa$, $IVb$, $Va$ and $Vb$ have corresponding designations $-F(IIIa)$, $F(IIIb)$, $-F(IVa)$, $F(IVb)$, $F(Va)$ and $-F(Vb)$, the designations for the successive airspaces S and axial lens thicknesses $t$ being given heretofore, the minus (—) sign meaning negative focal length.

Table I $1.72F < F(I) < 1.83F$
$7.10F < F(II) < 7.55F$
$14.41F < F(III) < 15.31F$
$25.96F < F(IV) < 27.57F$
$21.56F < -F(V) < 22.90F$
$8.76F < (IIIa) < 9.31F$
$5.96F < F(IIIb) < 6.34F$
$8.14F < -F(IVa) < 8.65F$
$6.65F < F(IVb) < 7.07F$
$11.98F < F(Va) < 12.72F$
$7.25F < -F(Vb) < 7.69F$
$1.62F < t_1 < 1.66F$
$1.31F < t_2 < 1.36F$
$.90F < t_3 < .97F$
$2.57F < t_4 < 2.65F$
$.90F < t_5 < .97F$
$2.57F < t_6 < 2.65F$
$1.65F < t_7 < 1.69F$
$.99F < t_8 < 1.01F$
$.076F < S_1 < .077F$
$.25F < S_2 < .28F$
$.050F < S_3 < .051F$
$.050F < S_4 < .051F$
$22.11F < S_5 < 22.56F$
$10.97F < S_6 < 12.13F$ Corresponding ranges of values are given in Table II herebelow for the radii of the successive lens surfaces $R_1$ to $R_{13}$ formed on lenses I to $Vb$ and refractive indices $n_D$ and Abbe numbers $\nu$ of the glasses used in the lens elements, the minus (—) sign used with the R values meaning that the center of curvature of the indicated surface lies on the object side of the surface. The diameter of the diaphragm is between $2.78F$ and $3.39F$.

Table II $R_1 > \pm 1000F$
$1.22F < -R_2 < 1.23F$
$12.66F < -R_3 < 12.82F$
$3.77F < -R_4 < 3.79F$
$46.88F < R_5 < 47.35F$
$5.86F < R_6 < 5.89F$
$5.86F < -R_7 < 5.89F$
$38.28F < R_8 < 38.66F$
$5.35F < R_9 < 5.37F$
$8.72F < -R_{10} < 8.75F$
$26.97F < R_{11} < 27.24F$
$13.63F < -R_{12} < 13.79F$
$7.03F < R_{13} < 7.10F$
$1.689 < n_D(I) < 1.693$
$1.689 < n_D(II) < 1.693$
$1.749 < n_D(IIIa) < 1.753$
$1.516 < n_D(IIIb) < 1.518$
$1.749 < n_D(IVa) < 1.753$
$1.516 < n_D(IVb) < 1.518$
$1.749 < n_D(VA) < 1.753$
$1.611 < n_D(Vb) < 1.615$
$54.0 < \nu(I) < 56.0$
$54.0 < \nu(II) < 56.0$
$27.0 < \nu(IIIa) < 28.5$
$64.0 < \nu(IIIb) < 66.0$
$27.0 < \nu(IVa) < 28.5$
$64.0 < \nu(IVb) < 66.0$
$27.0 < \nu(Va) < 28.5$
$43.0 < \nu(Vb) < 45.5$ For the nearest approach to optimum optical performance, the constituent lens elements of the doublet lens members III, IV and V should have ratios between their respective focal lengths substantially as follows:

$$\left. \begin{array}{l} \dfrac{-F(IIIa)}{F(IIIb)} = 1.47 \\ \dfrac{-F(IVa)}{F(IVb)} = 1.22 \\ \dfrac{F(Va)}{-F(Vb)} = 1.65 \end{array} \right\} \text{Absolute Values}$$

More specifically, the nominal or ideal values of the constructional data for the entire optical system are given substantially in the Table III herebelow wherein the symbolism remains the same as given in previous tables.

Table III $F(I) = 1.777F$
$F(II) = 7.323F$
$F(III) = 14.861F$
$F(IV) = 26.766F$
$-F(V) = 22.227F$
$-F(IIIa) = 9.034F$
$F(IIIb) = 6.149F$
$-F(IVa) = 8.399F$
$F(IVb) = 6.856F$
$R_1 = \text{PLANO}$
$-R_2 = 1.228F$
$-R_3 = 12.740F$
$-R_4 = 3.777F$
$R_5 = 47.116F$
$R_6 = 5.877F$
$-R_7 = 5.877F$
$R_8 = 38.474F$
$R_9 = 5.360F$
$-R_{10} = 8.733F$
$R_{11} = 27.113F$
$-R_{12} = 13.714F$
$R_{13} = 7.066F$
$t_1 = 1.638F$
$t_2 = 1.337F$
$t_3 = .936F$
$t_4 = 2.608F$

Table III—Continued $t_5 = .936F$
$t_6 = 2.601F$
$t_7 = 1.672F$
$t_8 = 1.003F$
$S_1 = .077F$
$S_2 = .267F$
$S_3 = .050F$
$S_4 = .050F$
$S_5 = 22.336F$
$S_6 = 11.553F$
$n_D(I) = 1.691$
$n_D(II) = 1.691$
$n_D(IIIa) = 1.751$
$n_D(IIIb) = 1.517$
$n_D(IVa) = 1.751$
$n_D(IVb) = 1.517$
$n_D(Va) = 1.751$
$n_D(Vb) = 1.613$
$\nu(I) = 54.8$
$\nu(II) = 54.8$
$\nu(IIIa) = 27.8$
$\nu(IIIb) = 64.5$
$\nu(IVa) = 27.8$
$\nu(IVb) = 64.5$
$\nu(Va) = 27.8$
$\nu(Vb) = 44.2$ Although only a preferred form of the present invention has been described and set forth mathematically, other detailed forms are possible and changes may be made therein conforming to the ranges of values given in the tables without departing from the spirit of the invention.

I claim:

1. A microscope semi-objective which is used in cooperation with a negative field flattening lens having 5× magnification per se, said negative lens being interchangeably used with one of a set of semi-objectives having different powers, said semi-objectives being parfocalized to each other, said field flattening lens and semi-objective being designed to be compensating to each other in producing a total image magnification of 100× and numerical aperture of 1.0, the first named semi-objective per se producing substantially 20× magnification and having an equivalent focal length which is designated $F_1$, the equivalent focal length of said field flattening lens being designated $-F(V)$, the equivalent focal length of the semi-objective together with said field flattening lens being designated F, said semi-objective comprising, a front singlet positive lens member designated I which is located rearwardly from a specimen surface to be examined at an axial distance designated $S_1$ from a specimen cover glass, a positive meniscus singlet lens member designated II located in optical alignment along an optical axis rearwardly from lens member I at an axial distance designated $S_2$, lens member II having a concave surface facing member I, a positive doublet lens member designated III located at an axial distance designated $S_3$ rearwardly of lens member II, member III being composed of a front negative meniscus lens element IIIa which lies in surface contact with a rear double convex lens element designated IIIb, a second positive doublet lens member designated IV which is located rearwardly of member III at an axial distance designated $S_4$ and is composed of a front negative meniscus lens element designated IVa which lies in surface contact with a rear double convex lens element IVb, the rear element being located at an axial distance $S_5$ from the aforesaid negative field flattening lens V, the ranges of values, in terms of F, for the constructional data by which the aforesaid lens members and lens elements I to IVb are formed being given in the table herebelow wherein F(I) to F(IV) designate the focal lengths of said members and $-F(V)$ designates the focal length of the aforesaid negative field flattening lens, the minus (—) sign meaning negative focal length, the designations $-F(IIIa)$, F(IIIb), $-F(IVa)$ and F(IVb) pertaining to the focal lengths of the respective lens elements aforementioned, the designations $t_1$ to $t_6$ relating to the axial thicknesses of the successive lens elements, the designations $S_1$ to $S_5$ being the successive airspaces numbering from the specimen cover glass rearwardly, $1.72F < F(I) < 1.83F$
$7.10F < F(II) < 7.55F$
$14.41F < F(III) < 15.31F$
$25.96F < F(IV) < 27.57F$
$21.56F < -F(V) < 22.90F$ $\dfrac{-F(IIIa)}{F(IIIb)} = 1.47$ substantially [(numerically)]

$\dfrac{-F(IVa)}{F(IVb)} = 1.22$ substantially [(numerically)]

$1.62F < t_1 < 1.66F$
$1.31F < t_2 < 1.36F$
$.90F < t_3 < .97F$
$2.57F < t_4 < 2.66F$
$.90F < t_5 < .97F$
$2.57F < t_6 < 2.65F$
$.076F < S_1 < .077F$
$.25F < S_2 < .28F$
$.050F < S_3 < .051F$
$.050F < S_4 < .051F$
$22.11F < S_5 < 22.56F$

2. A microscope semi-objective which is used in cooperation with a negative field flattening lens having 5× magnification per se, said negative lens being interchangeably used with one of a set of semi-objectives having different powers, said semi-objectives being parfocalized to each other, said field flattening lens and semi-objective being designed to be compensating to each other in producing a total image magnification of 100× and numerical aperture of 1.0, the first named semi-objective per se producing substantially 20× magnification and having an equivalent focal length which is designated $F_1$, the equivalent focal length of said field flattening lens being designated $-F(V)$, the equivalent focal length of the semi-objective together with said field flattening lens being designated F, said semi-objective comprising, a front singlet positive lens member designated I which is located rearwardly from the specimen surface to be examined at an axial distance designated $S_1$ above a specimen cover glass, a positive meniscus singlet lens member designated II located in optical alignment along an optical axis rearwardly from lens member I at an axial distance designated $S_2$, lens member II having a concave surface facing member I, a positive doublet lens member designated III located at an axial distance designated $S_3$ rearwardly of lens member II, member III being composed of a front negative meniscus lens element IIIa which lies in surface contact with a rear double convex lens element designated IIIb, a second positive doublet lens member designated IV which is located rearwardly of member III at an axial distance designated $S_4$ and is composed of a front negative meniscus lens elements designated IVa which lies in surface contact with a rear double convex lens element IVb, the rear element being located at an axial distance $S_5$ from the aforesaid negative field flattening lens V, the ranges of values, in terms of F, for the constructional data by which the aforesaid lens members and lens elements I to IVb are formed being given in the table herebelow wherein F(I) to F(IV) designate the focal lengths of said members and −F(V) designates the focal length of the aforesaid negative field flattening lens, the minus (−) sign meaning negative focal length, the designations −F(IIIa), F(IIIb), −F(IVa) and F(IVb) pertaining to the focal lengths of the respective lens elements aforementioned, the designations $t_1$ to $t_6$ relating to the axial thicknesses of the successive lens elements, the designations $S_1$ to $S_5$ being the successive airspaces numbering from the specimen surface rearwardly, and the ranges of absolute values being given for the refractive indices $n_D$ and Abbe number $\nu$ pertaining to the glasses in the aforesaid successive lens members and lens elements I to IVb, $$1.72F < F(I) < 1.83F$$
$$7.10F < F(II) < 7.55F$$
$$14.41F < F(III) < 15.31F$$
$$25.96F < F(IV) < 27.57F$$
$$21.56F < -F(V) < 22.90F$$

$$\left[ \frac{-F(IIIa)}{F(IVb)} = 1.47 \text{ subst. (numerically)} \right]$$

$$\frac{-F(IIIa)}{F(IIIb)} = 1.47 \text{ substantially}$$

$$\frac{-F(IVa)}{F(IVb)} = 1.22 \text{ substantially [(numerically)]}$$

$$1.62F < t_1 < 1.66F$$
$$1.31F < t_2 < 1.36F$$
$$.90F < t_3 < .97F$$
$$2.57F < t_4 < 2.65F$$
$$.90F < t_5 < .97F$$
$$2.57F < t_6 < 2.65F$$
$$.076F < S_1 < .077F$$
$$.25F < S_2 < .28F$$
$$.050F < S_3 < .051F$$
$$.050F < S_4 < .051F$$
$$22.11F < S_5 < 22.56F$$
$$1.689 < n_D(I) < 1.693$$
$$1.689 < n_D(II) < 1.693$$
$$1.749 < n_D(IIIa) < 1.753$$
$$1.516 < n_D(IIIb) < 1.518$$
$$1.749 < n_D(IVa) < 1.753$$
$$1.516 < n_D(IVb) < 1.518$$
$$54.0 < \nu(I) < 56.0$$
$$54.0 < \nu(II) < 56.0$$
$$27.0 < \nu(IIIa) < 28.5$$
$$64.0 < \nu(IIIb) < 66.0$$
$$27.0 < \nu(IVa) < 28.5$$
$$64.0 < \nu(IVb) < 66.0$$

3. A microscope semi-objective which is used in cooperation with a negative field flattening lens having 5× magnification per se, said negative lens being interchangeably used with one of a set of semi-objectives having different powers, said semi-objectives being parfocalized to each other, said field flattening lens and semi-objective being designed to be compensating to each other in producing a total image magnification of 100× and numerical aperture of 1.0, the first named semi-objective per se producing substantially 20× magnification and having an equivalent focal length which is designated $F_1$, the equivalent focal length of said field flattening lens being designated −F(V), the equivalent focal length of the semi-objective together with said field flattening lens being designated F, said semi-objective comprising, a front singlet positive lens member designated I which is located rearwardly from a specimen surface to be examined at an axial distance designated $S_1$ from a specimen cover glass, a positive meniscus singlet lens member designated II located in optical alignment along an optical axis rearwardly from lens member I at an axial distance designated $S_2$, lens member II having a concave surface facing member I, a positive doublet lens member designated III located at an axial distance designated $S_3$ rearwardly of lens member II, member III being composed of a front negative meniscus lens element IIIa which lies in surface contact with a rear double convex lens element designated IIIb, a second positive doublet lens member designated IV which is located rearwardly of member III at an axial distance designated $S_4$ and is composed of a front negative meniscus lens element designated IVa which lies in surface contact with a rear double convex lens element IVb, the rear element being located at an axial distance $S_5$ from the aforesaid negative field flattening lens V, the ranges of values, in terms of F, for the constructional data by which the aforesaid lens members and lens elements I to IVb are formed being given in the table herebelow wherein F(I) to F(IV) designate the focal lengths of said members and −F(V) designates the focal length of the aforesaid negative field flattening lens, the minus (−) sign meaning negative focal length, the designations −F(IIIa), F(IIIb), −F(IVa) and F(IVb) pertaining to the focal lenths of the respective lens elements aforementioned, the designations $t_1$ to $t_8$ relating to the axial thicknesses of the successive lenses, the designations $S_1$ to $S_5$ being the successive airspaces numbering from the specimen cover glass rearwardly, the semi-objective being provided with a diaphragm located rearwardly of lens member IV at an axial distance designated $S_6$ and having a diameter between 2.78F and 3.39F.

$$1.72F < F(I) 1.83F$$
$$7.10F < F(II) < 7.55F$$
$$14.41F < F(III) < 15.31F$$
$$25.96F < F(IV) < 27.57F$$
$$21.56F < -F(V) < 22.90F$$

$$\left[ \frac{-F(IIIa)}{F(IVb)} = 1.47 \text{ subst. (numerically)} \right]$$

$$\frac{-F(IIIa)}{F(IIIb)} = 1.47 \text{ substantially}$$

$$\frac{-F(IVa)}{F(IVb)} = 1.22 \text{ substantially [(numerically)]}$$

$$1.62F < t_1 < 1.66F$$
$$1.31F < t_2 < 1.36F$$
$$.90F < t_3 < .97F$$
$$2.57F < t_4 < 2.65F$$
$$.90F < t_5 < .97F$$
$$2.57F < t_6 < 2.65F$$
$$.076F < S_1 < .077F$$
$$.25F < S_2 < .28F$$
$$.050F < S_3 < .051F$$
$$.050F < S_4 < .051F$$
$$22.11F < S_5 < 22.56F$$
$$10.97F < S_6 < 12.13F$$

4. A microscope semi-objective which is used in cooperation with a negative field flattening lens having 5× magnification per se, said negative lens being interchangeably used with one of a set of semi-objectives having different powers, said semi-objectives being parfocalized to each other, said field flattening lens and semi-objective being designed to be compensating to each other in producing a total image magnification of 100× and numerical aperture of 1.0, the first named semi-objective per se producing substantially 20× magnification and having an equivalent focal length which is designated $F_1$, the equivalent focal length of said field flattening lens being designated $-F(V)$, the equivalent focal length of the semi-objective together with said field flattening lens being designated F, said semi-objective comprising, a front singlet positive lens member designated I which is located rearwardly from a specimen surface to be examined at an axial distance designated $S_1$ from a specimen cover glass, a positive meniscus singlet lens member designated II located in optical alignment along an optical axis rearwardly from lens member I at an axial distance designated $S_2$, lens member II having a concave surface facing member I, a positive doublet lens member designated III located at an axial distance designated $S_3$ rearwardly of lens member II, member III being composed of a front negative meniscus lens element IIIa which lies in surface contact with a rear double convex lens element designated IIIb, a second positive doublet lens member designated IV which is located rearwardly of member III at an axial distance designated $S_4$ and is composed of a front negative meniscus lens element designated IVa which lies in surface contact with a rear double convex lens element IVb, the rear element being located at an axial distance $S_5$ from the aforesaid negative field flattening lens V, the specific values, in terms of F, for the constructional data by which the aforesaid lens members and lens elements I to IVb are formed being given in the table herebelow wherein F(I) to F(IV) designate the focal lengths of said members and $-F(V)$ designates the focal length of the aforesaid negative field flattening lens, the minus (—) sign meaning negative focal length, the designations $-F(IIIa)$, $F(IIIb)$, $-F(IVa)$ and $F(IVb)$ pertaining to the focal lengths of the respective lens elemens aforementioned, the designations $t_1$ to $t_6$ relating to the axial thicknesses of the successive lens elements, the designations $S_1$ to $S_5$ being the successive airspaces numbering from the specimen cover glass rearwardly, $$F(I)=1.77F$$
$$F(II)=7.323F$$
$$F(III)=14.861F$$
$$-F(IIIa)=9.034F$$
$$F(IIIb)=6.149F$$
$$F(IV)=26.766F$$
$$-F(IVa)=8.399F$$
$$F(IVb)=6.856F$$
$$-F(V)=22.227F$$
$$t_1=1.638F$$
$$t_2=1.337F$$
$$t_3=.936F$$
$$t_4=2.608F$$
$$t_5=.936F$$
$$t_6=2.601F$$
$$S_1=.077F$$
$$S_2=.267F$$
$$S_3=.050F$$
$$S_4=.050F$$
$$S_5=22.336F$$
$$1.689<n_D(I)<1.693$$
$$1.689<n_D(II)<1.693$$
$$1.749<n_D(IIIa)<1.753$$
$$1.516<n_D(IIIb)<1.518$$
$$1.749<n_D(IVa)<1.753$$
$$1.516<n_D(IVb)<1.518$$
$$54.0<\nu(I)<56.0$$
$$54.0<\nu(II)<56.0$$
$$27.0<\nu(IIIa)<28.5$$
$$64.0<\nu(IIIb)<66.0$$
$$27.0<\nu(IVa)<28.5$$
$$64.0<\nu(IVb<66.0$$

wherein $n_D$ and $\nu$ designate the refractive index and Abbe number respectively of the glasses used, the absolute values thereof being given in the table.

5. A microscope semi-objective which is used in cooperation with a negative field flattening lens having 5× magnification per se, said negative lens being interchangeably used with one of a set of semi-objectives having different powers, said semi-objectives being parfocalized to each other, said field flattening lens and semi-objective being designed to be compensating to each other in producing a total image magnification of 100× and numerical aperture of 1.0, the first named semi-objective per se producing substantially 20× magnification and having an equivalent focal length which is designated $F_1$, the equivalent focal length of said field flattening lens being designated $-F(V)$, the equivalent focal length of the semi-objective together with said field flattening lens being designated F, said semi-objective comprising, a front singlet positive lens member designated I which is located rearwardly from a specimen surface to be examined at an axial distance designated $S_1$ from a specimen cover glass, a positive meniscus singlet lens member designated II located in optical alignment along an optical axis rearwardly from lens member I at an axial distance designated $S_2$, lens member II having a concave surface facing member I, a positive doublet lens member designated III located at an axial distance designated $S_3$ rearwardly of lens member II, member III being composed of a front negative meniscus lens element IIIa which lies in surface contact with a rear double convex lens element designated IIIb, a second positive doublet lens member designated IV which is located rearwardly of member III at an axial distance designated $S_4$ and is composed of a front negative meniscus lens element designated IVa which lies in surface contact with a rear double convex lens element IVb, the rear element being located at an axial distance $S_5$ from the aforesaid negative field flattening lens V which is composed of a front double convex lens elements Va and a rear double concave lens element Vb which lie in contact with each other along an interface, the respective axial thicknesses of the elements IVa and IVb being designated $t_5$ and $t_6$ and the thicknesses of the elements Va and Vb being designated $t_7$ and $t_8$.

the ranges of values, in terms of F, for the constructional data by which the aforesaid lens members and lens elements I to Vb are formed being given in the table herebelow wherein the designations $t_1$ to $t_8$ relating to the axial thicknesses of the successive lens elements, the designations $S_1$ to $S_5$ being the successive airspaces numbering from the cover glass surface rearwardly, the designations $R_1$ to $R_{13}$ being the radii of the successive refractive surfaces of the lens elements I to Vb, the minus (—) sign used with the R values meaning that such a surface is concave toward entrant rays, and the absolute values of the refractive indices $n_D$ and Abbe numbers for the glass in the successive lens elements being designated successively $n_D(I)$ to $n_D(Vb)$ and $\nu(I)$ to $\nu(Vb)$ respectively, $$R_1>\pm 1000F$$
$$1.22F<-R_2<1.23F$$
$$12.66F<-R_3<12.82F$$
$$3.77F<-R_4<3.79F$$
$$46.88F<R_5<47.35F$$
$$5.86F<R_6<5.89F$$
$$5.86F<-R_7<5.89F$$
$$38.28F<R_8<38.66F$$
$$5.35F<R_9<5.37F$$
$$8.72F<-R_{10}<8.75F$$
$$26.97F<R_{11}<27.24F$$
$$13.63F<-R_{12}<13.79F$$
$$7.03F<R_{13}<7.10F$$

$1.62F < t_1 < 1.66F$
$1.31F < t_2 < 1.36F$
$.90F < t_3 < .97F$
$2.57F < t_4 < 2.65F$
$.90F < t_5 < .97F$
$2.57F < t_6 < 2.65F$
$1.65F < t_7 < 1.69F$
$.99F < t_8 < 1.01F$
$.076F < S_1 < .077F$
$.25F < S_2 < .28F$
$.050F < S_3 < .051F$
$.050F < S_4 < .051F$
$22.11F < S_5 < 22.56F$
$1.689 < n_D(I) < 1.693$
$1.689 < n_D(II) < 1.693$
$1.749 < n_D(IIIa) < 1.753$
$1.516 < n_D(IIIb) < 1.518$
$1.749 < n_D(IVa) < 1.753$
$1.516 < n_D(IVb) < 1.518$
$1.749 < n_D(Va) < 1.753$
$1.611 < n_D(Vb) < 1.615$
$54.0 < \nu(I) < 56.0$
$54.0 < \nu(II) < 56.0$
$27.0 < \nu(IIIa) < 28.5$
$64.0 < \nu(IIIb) < 66.0$
$27.0 < \nu(IVa) < 28.5$
$64.0 < \nu(IVb) < 66.0$
$27.0 < \nu(Va) < 28.5$
$43.0 < \nu(Vb) < 45.5$

6. A microscope semi-objective which is used in cooperation with a negative field flattening lens having 5× magnification per se, said negative lens being interchangeably used with one of a set of semi-objectives having different powers, said semi-objectives being parfocalized to each other, said field flattening lens and semi-objective being designed to be compensating to each other in producing a total image magnification of 100× and numerical aperture of 1.0, the first named semi-objective per se producing substantially 20× magnification and having an equivalent focal length which is designated $F_1$, the equivalent focal length of said field flattening lens being designated $-F(V)$, the equivalent focal length of the semi-objective together with said field flattening lens being designated F, said semi-objective comprising, a front singlet positive lens member designated I which is located rearwardly from a specimen surface to be examined at an axial distance designated $S_1$ from a specimen cover glass, a positive meniscus singlet lens member designated II located in optical alignment along an optical axis rearwardly from lens member I at an axial distance designated $S_2$, lens member II having a concave surface facing member I, a positive doublet lens member designated III located at an axial distance designated $S_3$ rearwardly of lens member II, member III being composed of a front negative meniscus lens element IIIa which lies in surface contact with a rear double convex lens element designated IIIb, a second positive doublet lens member designated IV which is located rearwardly of member III at an axial distance designated $S_4$ and is composed of a front negative meniscus lens element designated IVa which lies in surface contact with a rear double convex lens element IVb, the rear element being located at an axial distance $S_5$ from the aforesaid negative field flattening lens V which is composed of a front double convex lens element Va and a rear double concave lens element Vb which lie in contact with each other along an interface, the respective axial thicknesses of the elements IVa and IVb being designated $t_5$ and $t_6$ and the thicknesses of the elements Va and Vb being designated $t_7$ and $t_8$, the specific values in terms of F, for the constructional data by which the aforesaid lens members and lens elements I to Vb are formed being given in the table herebelow wherein the designations $t_1$ to $t_8$ relating to the axial thicknesses of the successive lens elements, the designations $S_1$ to $S_5$ being the successive airspaces numbering from the specimen surface rearwardly, the designations $R_1$ to $R_{13}$ being radii of the successive refractive surfaces of the lens elements I to Vb, the minus (−) sign used with the R values meaning that such a surface is concave toward entrant rays, and the specific absolute values of the refractive indices $n_D$ and Abbe numbers $\nu$ for the glass in the successive lens elements being designated successively $n_D(I)$ to $n_D(Vb)$ and $\nu(I)$ to $\nu(Vb)$ respectively, $R_1 = $ PLANO
$-R_2 = 1.288F$
$-R_3 = 12.740F$
$-R_4 = 3.777F$
$R_5 = 47.116F$
$R_6 = 5.877F$
$-R_7 = 5.877F$
$R_8 = 38.474F$
$R_9 = 5.360F$
$-R_{10} = 8.733F$
$R_{11} = 27.113F$
$-R_{12} = 13.714F$
$R_{13} = 7.066F$
$t_1 = 1.638F$
$t_2 = 1.337F$
$t_3 = .936F$
$t_4 = 2.608F$
$t_5 = .936F$
$t_6 = 2.601F$
$t_7 = 1.672F$
$t_8 = 1.003F$
$S_1 = .077F$
$S_2 = .267F$
$S_3 = .050F$
$S_4 = .050F$
$S_5 = 22.336F$
$S_6 = 11.553F$
$n_D(I) = 1.691$
$n_D(II) = 1.691$
$n_D(IIIa) = 1.751$
$n_D(IIIb) = 1.517$
$n_D(IVa) = 1.751$
$n_D(IVb) = 1.517$
$n_D(Va) = 1.751$
$n_D(Vb) = 1.613$
$\nu(I) = 54.8$
$\nu(II) = 54.8$
$\nu(IIIa) = 27.8$
$\nu(IIIb) = 64.5$
$\nu(IVa) = 27.8$
$\nu(IVb) = 64.5$
$\nu(Va) = 27.8$
$\nu(Vb) = 44.2$

References Cited

UNITED STATES PATENTS 2,206,155 7/1940 Boegehold _____ 350—216
3,410,633 11/1968 Young.

FOREIGN PATENTS 1,186,234 1/1965 Germany.

DAVID SCHONBERG, Primary Examiner
PAUL A. SACHER, Assistant Examiner

U.S. Cl. X.R.

350—216

PO-1050
(5/69)

UNITED STATES PATENT OFFICE
CERTIFICATE OF CORRECTION

Patent No. 3,497,290      Dated February 24, 1970

Inventor(s) Harold E. Rosenberger

It is certified that error appears in the above-identified patent and that said Letters Patent are hereby corrected as shown below:

Col.2, line 55, change "IBb" to -- IVb --;
     line 64, change "eight" to -- light --
Col.3, line 8, change "toluene" to -- tolerance --
     line 46, change "8.76F<(IIIa)" to -- $8.76F < -F(IIIa)$ --
Col.6, line 29, change "$t_4 < 2.66F$" to -- $t_4 < 2.65F$ --
Col.8, between lines 64-65, insert "
$$1.689 < n_D(I) < 1.693$$
$$1.689 < n_D(II) < 1.693$$
$$1.749 < n_D(IIIa) < 1.753$$
$$1.516 < n_D(IIIb) < 1.518$$
$$1.749 < n_D(IVa) < 1.753$$
$$1.516 < n_D(IVb) < 1.518$$
$$54.0 < \nu(I) < 56.0$$
$$54.0 < \nu(II) < 56.0$$
$$27.0 < \nu(IIIa) < 28.5$$
$$64.0 < \nu(IIIb) < 66.0$$
$$27.0 < \nu(IVa) < 28.5$$
$$64.0 < \nu(IVb) < 66.0$$

wherein $n_D$ and $\nu$ designate the refractive index and Abbe number respectively of the glasses used, the absolute values thereof being given in the table."

Col.9, delete lines 62-75, beginning with "$1.689 < n_D(I) < 1.693$"
                           and ending with "Abbe"
Col.10, delete lines 1-2

SIGNED AND
SEALED
NOV 10 1970

(SEAL)
Attest:

Edward M. Fletcher, Jr.
Attesting Officer

WILLIAM E. SCHUYLER, JR.
Commissioner of Patents